(12) United States Patent
Yoshioka et al.

(10) Patent No.: US 6,485,862 B1
(45) Date of Patent: Nov. 26, 2002

(54) THIN BATTERY AND METHOD OF MANUFACTURING

(75) Inventors: Shoji Yoshioka, Tokyo (JP); Hiroaki Urushibata, Tokyo (JP); Hisashi Shiota, Tokyo (JP); Jun Aragane, Tokyo (JP); Makiko Kise, Tokyo (JP); Shigeru Aihara, Tokyo (JP); Daigo Takemura, Tokyo (JP); Takashi Nishimura, Tokyo (JP); Yasuhiro Yoshida, Tokyo (JP); Osamu Hiroi, Tokyo (JP); Kouji Hamano, Tokyo (JP); Hironori Ozaki, Tokyo (JP); Hideo Ichimura, Tokyo (JP); Kenji Kawaguchi, Tokyo (JP); Masaharu Moriyasu, Tokyo (JP); Shinji Nakadeguchi, Tokyo (JP); Michio Murai, Tokyo (JP); Hisashi Tsukamoto, Kyoto (JP)

(73) Assignees: Mitsubishi Denki Kabushiki Kaisha, Tokyo (JP); Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/622,847
(22) PCT Filed: Dec. 20, 1998
(86) PCT No.: PCT/JP98/05990
§ 371 (c)(1),
(2), (4) Date: Feb. 12, 2001
(87) PCT Pub. No.: WO00/41263
PCT Pub. Date: Jul. 13, 2000

(51) Int. Cl.$^7$ .......................... H01M 2/02; H01M 10/04
(52) U.S. Cl. .......................... 429/127; 429/94; 429/176; 29/623.2
(58) Field of Search .......................... 429/94, 162, 176, 429/127; 29/623.2

(56) References Cited

U.S. PATENT DOCUMENTS

| | | | | |
|---|---|---|---|---|
| 4,035,909 A | * | 7/1977 | Dey | .......................... 29/623.2 |
| 4,203,201 A | * | 5/1980 | Mead et al. | .......................... 29/623.2 X |
| 5,431,701 A | * | 7/1995 | Kagawa et al. | .............. 29/623.2 |
| 5,895,731 A | * | 4/1999 | Clingempeel | ................ 429/162 |
| 5,981,107 A | | 11/1999 | Hamano et al. | |
| 6,024,773 A | | 2/2000 | Inuzuka et al. | |
| 6,051,342 A | | 4/2000 | Hamano et al. | |
| 6,124,061 A | | 9/2000 | Hamano et al. | |
| 6,136,471 A | | 10/2000 | Yoshida et al. | |
| 6,231,626 B1 | | 5/2001 | Yoshida et al. | |
| 6,232,014 B1 | | 5/2001 | Shiota et al. | |
| 6,235,066 B1 | | 5/2001 | Inuzuka et al. | |
| 6,291,102 B1 | | 9/2001 | Yoshida et al. | |

FOREIGN PATENT DOCUMENTS

| | | | | |
|---|---|---|---|---|
| JP | 2-072566 | * | 3/1990 | .......... H01M/10/40 |
| JP | 5-054910 | * | 3/1993 | .......... H01M/10/40 |
| JP | 5-121099 | * | 5/1993 | .......... H01M/10/40 |
| JP | 5-275087 | * | 10/1993 | ............ H01M/6/12 |
| JP | 6-187975 | * | 7/1994 | ............ H01M/4/04 |
| JP | 63-048778 | * | 3/1998 | .......... H01M/10/40 |
| JP | 10-177865 | * | 6/1998 | .......... H01M/10/40 |

* cited by examiner

Primary Examiner—Stephen Kalafut
(74) Attorney, Agent, or Firm—Oblon, Spivak, McClelland, Maier & Neustadt, P.C.

(57) ABSTRACT

A battery body, which is composed of a laminated body obtained by laminating a cathode and an anode via a separator or a wound body obtained by winding them in a laminated structure and a plurality of leads connected to the cathode and the anode, is contained in a flexible package, and after an electrolyte solution is injected thereinto, an opening of the package is sealed at pressure which is lower than atmospheric pressure and is reduced to not less than vapor pressure of the electrolyte solution so that a thin battery is fabricated. A rise in pressure in the battery due to generation of gas in the battery and volume expansion of the gas can be restrained when the battery is maintained at high temperature.

7 Claims, 3 Drawing Sheets

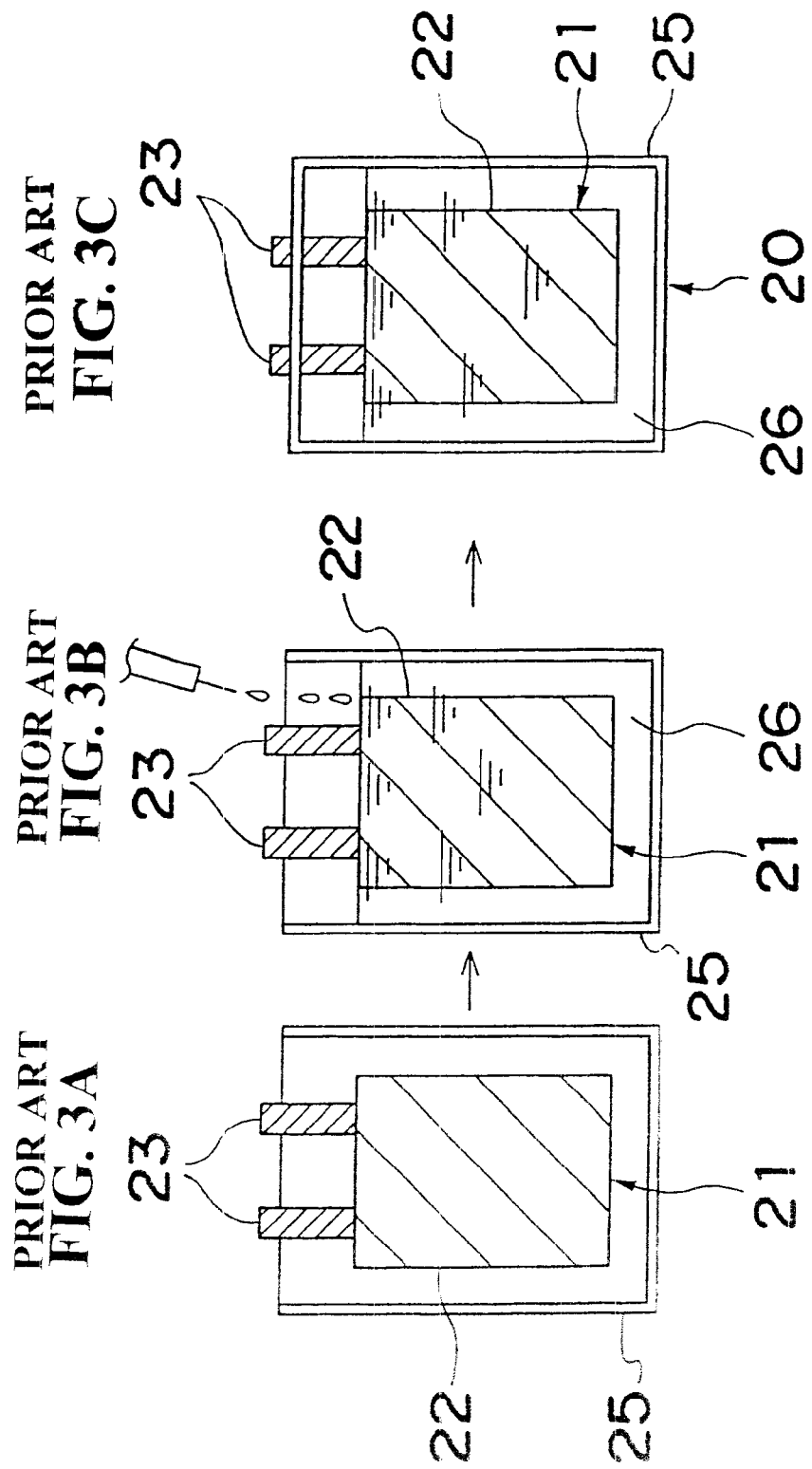

THIN BATTERY AND METHOD OF MANUFACTURING

BACKGROUND OF THE INVENTION

1. Field of the Invention

The present invention relates to a process for fabricating a thin battery and a thin battery fabricated thereby.

2. Description of the Prior Art

In recent years, as portable equipments such as a notebook personal computer and a portable telephone have spread, applications of batteries with high-energy density which is represented by an Ni metal hydride secondary battery and lithium-ion secondary battery have been expanded rapidly. Conventionally, as for a lithium-ion battery, its winding body, which was obtained by winding a cathode and an anode in a laminated structure via a separator, was contained in a metallic can, and the cathode, the separator and the anode came closely into contact by means of a pressure of the can so that electric connection was obtained. However, since the metallic can was used, there arose a problem that the battery is difficulty lightened and thinned.

In order to solve this problem, Japanese Patent Laid-Open Publication No. 10-177865 (1998) or the like suggests a structure of a thin battery and process for fabricating the same which do not require a metallic can because a cathode and an anode are bonded to a separator before they are contained in a battery package. FIG. 3 are step diagrams showing one example of a conventional process for fabricating a thin lithium-ion secondary battery. A battery body 21 is composed of a wound body 22 which is obtained by winding a cathode and an anode via a separator in a laminated structure and leads 23 which are connected to the cathode and the anode, respectively. The battery body 21 as shown in FIG. 1(A) is contained in a flexible package 25 composed of a laminated film made of metallic foil and resin film, and a battery 20 is fabricated by a step shown in FIG. 1(B) of injecting electrolyte solution 26 into the battery body 21 and a step shown in FIG. 1(C) of sealing a opening of the package 25 in a state that the leads 23 are taken out from the package 25. These steps are carried out in an atmosphere of inert gas and under normal pressure.

However, when the battery 20 is left to stand in a high-temperature environment for use or preservation after sealing, a volume of gas remaining in the package is expanded, and gas is generated due to self-discharge of the battery and vapor pressure of the electrolyte solution rises. As a result, internal pressure of the battery rises, the hazard that the battery is exploded increases. Moreover, in the above process, since air bubbles remaining in porous battery materials causes insufficient filling of the electrolyte solution into the porous battery materials, paths of the electrolyte solution are blocked. Accordingly, internal resistance of the battery rises.

Furthermore, in order to make charge and discharge cycle to progress smoothly, a preparatory charging is carried out as a pre-treatment after the sealing. The pre-treatment comprises generating gas that is to be generated due to reaction between the anode and the electrolyte solution in the initial stage of a charge, before the charge and discharge cycles hereinafter. As a result, in the case where the battery is put in the high-temperature environment, the volume of gas generated due to the preparatory charge is expanded, thereby possibly causing the problem similar to the above one.

SUMMARY OF THE INVENTION

Therefore, it is an object of the present invention to provide a process for fabricating a thin battery and a thin battery fabricated thereby which can solve the above problems and are capable of filling a battery body with an electrolyte solution without expanding the volume of the battery even if the battery is put into a high-temperature environment and without involving a rise in the internal resistance of the battery.

In order to solve the above problems, the inventors have concentrated themselves on researches and found that a package is sealed at a pressure which is lower than atmospheric pressure and is reduced to not less than vapor pressure of the electrolyte solution so that expansion of the volume of a thin battery can be suppressed even when the battery is left in a high-temperature environment.

A process for fabricating a thin battery of the present invention, in which a battery body is contained in a flexible package, the battery body being composed of either a laminated body obtained by laminating a cathode and an anode via a separator or a wound body obtained by winding a cathode and an anode via a separator in a laminated structure and a plurality of leads, and being sealed in the package, is characterized by including:

containing the battery body into the package and injecting an electrolyte solution into the package; and sealing an opening of the package at a reduced pressure which is lower than atmospheric pressure and is not less than vapor pressure of the electrolyte solution. According to the present invention, since the pressure in the battery is kept at the reduced pressure which is lower than atmospheric pressure, rise in pressure in the battery due to the volume expansion of the gas in the battery, and expansion of the volume of the battery can be restrained, even if the battery is left in a high-temperature environment. The pressure at the time of sealing is preferably a pressure which is lower than the atmospheric pressure and is not less than vapor pressure of the electrolyte solution at the temperature of the sealing. In order to restrain evaporation of the electrolyte solution, the pressure at the time of sealing is preferably 1.5 times as high as the vapor pressure of the electrolyte solution, and more preferably three times as high as the vapor pressure of the same.

In addition, after injecting the electrolyte solution into the package at the reduced pressure, that is, the gas in pores of the battery body is evacuated and the electrolyte solution is injected, the package can be sealed at a pressure which is lower than the atmospheric pressure and is not less than the vapor pressure of the electrolyte solution. As a result, in addition to the above effect, since the battery body can be filled with a sufficient amount of the electrolyte solution while the evaporation of the electrolyte solution being restrained, rise in internal resistance of the battery can be prevented.

Further, it is preferable that a preparatory charging step can be included between the step of injecting the electrolyte solution and the step of sealing at the reduced pressure. Since the gas which is generated at the time of the preparatory charging can be evacuated at the time of the sealing at the reduced pressure, the volume expansion of the battery due to the rise in the pressure in the battery can be restrained even under a high-temperature environment In addition, the package can be sealed at a reduced pressure by thermally fusing the opening.

In addition, it is desirable that the package is sealed at a reduced pressure at a temperature which is not more than room temperature, preferably not more than room temperature to not less than 5° C., and more preferably not more than 30° C. to not less than 5° C.

In addition, it is preferable that a battery body, which is obtained by bonding the separator to at least one surface of the cathode and the anode, is used. Since strong metal can is not required in order to keep electric connection between the cathode, the separator and the anode, a thin and light battery without volume expansion can be provided.

In addition, a thin battery which comprises a battery body, which is composed of either a laminated body obtained by laminating a cathode and an anode via a separator or a wound body obtained by winding a cathode and an anode via a separator in a laminated structure and a plurality of leads which are connected to the cathode and the anode, respectively, and an electrolyte solution, and a flexible package for containing the battery body therein, is characterized in that the package is sealed at a reduced pressure, thereby maintaining a pressure in the package to be lower than atmospheric pressure.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals.

FIG. 1A is a cross sectional view of a battery; FIG. 1B is a cross sectional view showing the step of injecting an electrolyte solution in the package; FIG. 1C is a cross sectional view showing the step of preparatory charging; and FIG. 1D is a cross sectional view showing the step of sealing at a reduced pressure.

FIGS. 3A–3C are typical step diagrams showing a conventional process for fabricating a thin battery: FIG. 3A is a cross sectional view of the battery package; FIG. 3B is a cross sectional view showing the step of injecting an electrolyte solution in the package; and FIG. 3C is a cross sectional view showing the step of sealing.

DETAILED DESCRIPTION OF THE PREFERRED EMBODIMENTS

Figure 1:
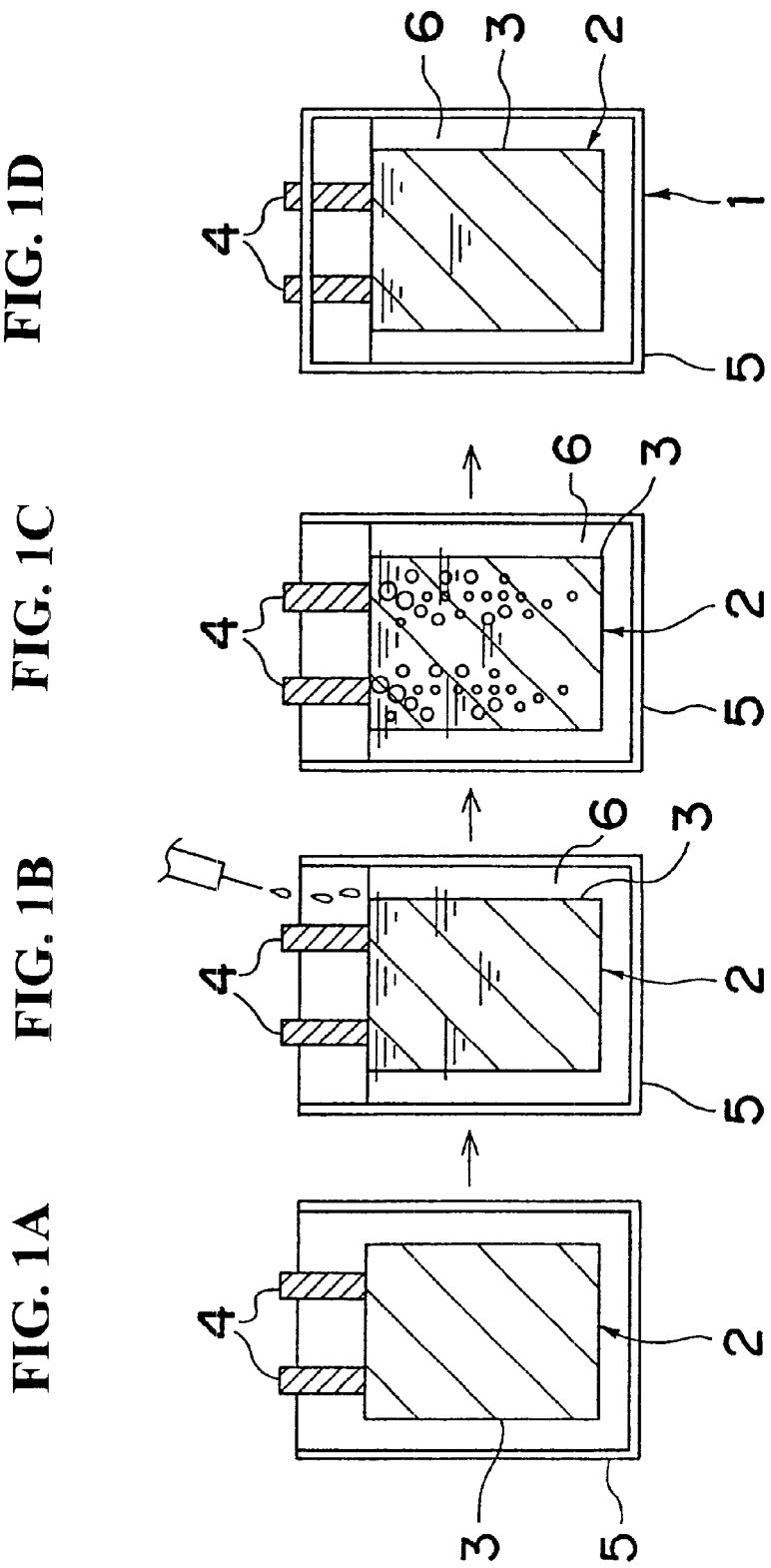
FIGS. 1A–1D are typical step diagrams showing a process for fabricating a thin battery according to an embodiment of the present invention.

FIGS. 1A–1D are typical step diagrams showing a process for fabricating a thin battery according to an embodiment of the present invention. A battery body 2 is composed of a wound body 3 which is obtained by winding a cathode and an anode via a separator in a laminated structure, and leads 4 are connected to the cathode and the anode, respectively. The battery body 2 is contained in a package 5, which is made of light-weighted and non-moisture permeable metallic foil such as aluminum or a laminated film of metallic foil and resin, and has an opening. The battery body 2 as shown in FIG. 1A contained in the package 5 is placed in a vacuum chamber (not shown) in which a heat sealer is provided, and the vacuum chamber is evacuated for predetermined time. Next, a specified amount of electrolyte solution 6 is injected into the battery body 2 by using a syringe or the like so as to be impregnated (FIG. 1B). Next, the pressure in the vacuum chamber is returned to atmospheric pressure and is preparatorily charged for predetermined time (FIG. 1C). Thereafter, the pressure is reduced gradually and closely to vapor pressure of the electrolyte solution 6, and after predetermined time passes, the opening of the package 5 is thermally fused by using the sheet sealer so as to be sealed (FIG. 1D). After the sealing, the pressure in the vacuum chamber is returned gradually to the atmospheric pressure, and the battery 1 is taken out under the atmospheric pressure.

The cathode is fabricated in such a manner that conductive carbon powder and polyvinylidene fluoride (PVDF) of an integrating agent are added to a cathode active material and the obtained material is dispersed in N-methyl pyrrolidone (NMP) so that a cathode paste is obtained. Then, the cathode paste is applied to a cathode current collector so as to be dried. As the cathode active material, composite oxide of lithium which enables lithium ion to be incorporated and released and transition metal such as cobalt, manganese and nickel, chalcogen compound including lithium, composite compound of them, or composite oxide, chalcogen compound and composite compound to which various elements are added respectively can be used. The anode is formed in such a manner that conductive carbon powder and PVDF are added to a carbon material or the like as an anode active material which enables lithium ion to be incorporated and released, and the obtained material is dispersed in NMP so that an anode paste is obtained, and the anode paste is applied to an anode current collector so as to be dried.

In addition, the cathode current collector and the anode current collector may be metal which is stable in the lithium-ion battery. Aluminum is preferable as the cathode current collector, and copper is preferable as the anode current collector. Moreover, copper, aluminum, nickel and the like are preferable as the leads.

In addition, as a separator, a material with insulating properties that can be impregnated with the electrolyte solution and has sufficient strength can be used. A porous film made of polyethylene, polyproplene or the like is preferable as the separator.

In addition, a battery body may be used, in which a separator is bonded to at least one surface of a cathode and an anode according to the following method. Namely, in the case where the separator is bonded to the anode, NMP solution containing dissolved PVDF and dispersed oxide aluminum powder is used as adhesive so as to be applied to one surface of each of two separators. Thereafter, before the adhesive is dried, the separators are brought closely into contact with both the surfaces of the anode, and they are laminated and dried so that the anode to which the separators were bonded is formed. The anode to which the separators were bonded is laminated with the cathode via the separators or wound in a laminated structure to form the battery body.

In addition, the electrolyte solution, which was obtained in the manner that electrolyte such as $LiPF_6$, $LiClO_4$, $LiBF_4$, $LiCF_3SO_3$, $LiN(CF_3SO_2)_2$ and $LiC(CF_3SO_2)_3$ is dissolved in an ether group solvent such as dimethoxyethane, diethoxyethane, dimethyl ether and diethyl ether, or in an ester group solvent such as ethylene carbonate, dimethyl carbonate, diethyl carbonate and propylene carbonate, or in a mixture of them, can be used.

Embodiment 1

Mixed electrolyte solution which is composed of ethylene carbonate (EC) and dimethyl carbonate (DMC) (volume ratio: EC:DMC=4:6) was used as the electrolyte solution, and the mixed electrolyte solution was injected into the battery body which was obtained by bonding the separators to the anode, at a reduced pressure and was preparatorily charged. Thereafter, a pressure in the vacuum chamber was reduced to 8.01 kPa which is three times as high as vapor pressure of 2.67 kPa of the mixed electrolyte solution at room temperature, and the package 10 was sealed. A dimension of an obtained lithium-ion battery was 130 mm×60 mm×4 mm. After the pressure is returned to the atmospheric pressure and maintained for specified time, the whole battery was put into fluid paraffin, and the package is opened therein. Then, the gas discharged at that time was collected, and the volume of the gas was measured, and the measured value was an amount of gas remaining in the package. Thereafter, an increased in thickness of the battery due to the volume expansion of the gas at the time of maintaining the battery at 85° C. for 24 hours was measured. The result is shown in Table 1. The residual amount of gas was 0.05 ml, and when it was compared with 1.55 ml in a comparative example (sealed under atmospheric pressure), only a slight amount of gas remained. Moreover, the increase in thickness of the battery was not more than 0.1 mm, namely, the thickness hardly changed.

Embodiment 2

As the electrolyte solution, the mixed electrolyte solution made of ethylene carbonate (EC) and diethyl carbonate (DEC) (volume ratio: EC:DEC=3:7) was used, and the package was sealed at room temperature at the pressure of 4.02 kPa which is three times as high as the vapor pressure of 1.34 kPa of the mixed electrolyte solution. Except for these points, a lithium-ion secondary battery was produced in the similar manner to the embodiment 1, and the battery was maintained at 85° C. for 24 hours and an increase in thickness of the battery was checked. The result is shown in Table 1. A residual amount of gas was reduced to 0.03 ml. The lower the vapor pressure of the electrolyte solution employed in the battery, sealing at the lower pressure becomes possible, and thus the residual amount of gas can be reduced. Even when the battery was maintained at high temperature, the increase in thickness was not more than 0.1 mm, namely, the thickness hardly changed.

Embodiment 3

A lithium-ion secondary battery was produced in the manner similar to embodiment 2 except that the package was sealed at the reduced pressure of 53.3 kPa in the vacuum chamber. A change in an increase in thickness of the battery at the time of preserving the battery at 85° C. for 24 hours is shown in Table 1. The increase in thickness of the battery was not more than 0.1 mm in the present embodiment. In this embodiment, when a rise in pressure of the gas which is generated due to the self-discharge reaction of the battery and a rise in vapor pressure of the electrolyte solution are added, the sum was not higher than 48 kPa. It is considered that this is because the pressure did not reach the atmospheric pressure of 101.3 kPa.

Embodiment 4

After the battery was cooled to 5° C., the battery was put into the vacuum chamber and the pressure in the chamber was reduced to 2.01 kPa and the opening of the package was sealed. A lithium-ion secondary battery was produced in the manner similar to embodiment 2 except for the above points, and the battery was preserved at 85° C. for 24 hours. The result is shown in Table 1. A residual volume of gas in the package was reduced to not more than a detection limit, and even when the battery was preserved at high temperature, the increase in thickness of the battery was not more than 0.1 mm.

Embodiment 5

Figure 2:
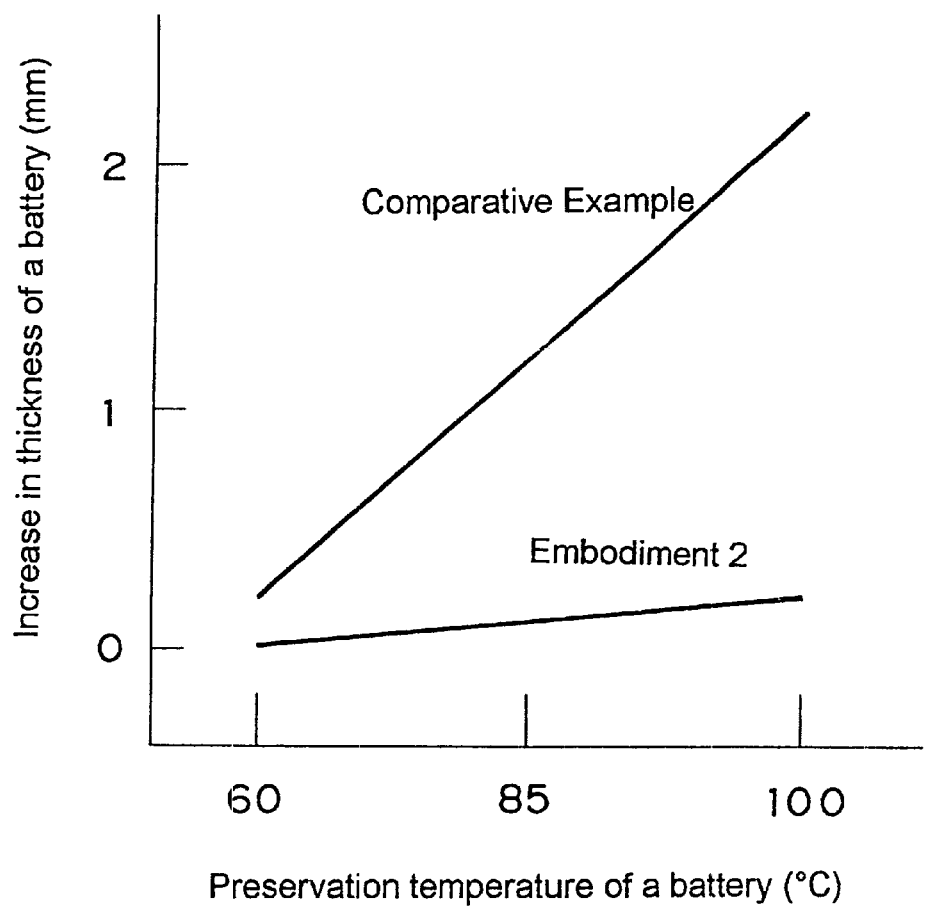
FIG. 2 is a graph showing a relationship between a preservation temperature of a battery and increase in thickness of the battery in an embodiment 5 of the present invention.

A lithium-ion secondary battery which was produced in the manner similar to the embodiment 2 was preserved in an oven where the temperature was set to 60° C., 85° C. and 100° C. for 24 hours, and an increase in thickness of the battery due to generation of the gas in the battery and volume expansion was checked. The result is shown in FIG. 2. At any temperature the increase in thickness of the battery was slight compared with the comparative example.

Comparative Example

A lithium-ion secondary battery was produced in the manner similar to the embodiment 2 except that the package was sealed at a normal pressure.

The batteries in the above embodiments can be applied not only to organic electrolyte solution type, solid electrolyte type and gel electrolyte type lithium-ion secondary batteries but also to lithium/manganese dioxide primary batteries and the other secondary batteries. Further, they can be applied also to aqueous electrolyte solution type primary batteries and second batteries.

TABLE 1

|  | Residual amount of gas in a battery (ml) | Increase in thickness of a battery after the battery is preserved at 85° C. for 24 hours (mm) |
| --- | --- | --- |
| Embodiment 1 | 0.05 | not more than 0.1 |
| Embodiment 2 | 0.03 | not more than 0.1 |
| Embodiment 3 | 0.1 | not more than 0.1 |
| Embodiment 4 | 0.00 (not more than detection limit) | not more than 0.1 |
| Comparative Example | 1.55 | 1.2 |

What is claimed is:

1. A process for fabricating a thin battery including a battery body sealed in a flexible package, the battery body having a plurality of leads and either a laminated body obtained by laminating a cathode and an anode via a separator or a wound body obtained by winding a cathode and an anode via a separator into a laminated structure, comprising:

containing the battery body into the package;

injecting an electrolyte solution into the package; and sealing an opening of the package at a reduced pressure lower than atmospheric pressure and not less than a vapor pressure of the electrolyte solution.

2. The process according to claim 1, wherein the step of injecting the electrolyte solution is carried out at said reduced pressure.

3. The process according to claim 1, further comprising:

preparatory charging between the step of injecting the electrolyte solution and the step of sealing at said reduced pressure.

4. The process according to claim 1, wherein the step of sealing is carried out by fusing the opening thermally.

5. The process according to claim 1, wherein the step of sealing is carried out at temperature which is not more than room temperature.

6. The process according to claim 1, further comprising:

bonding the separator to at least one surface of the cathode and the anode.

7. A thin battery comprising:

a battery body including, at least one of a laminated body obtained by laminating a cathode and an anode via a separator and a wound body obtained by winding a cathode and an anode via a separator into a laminated structure, and a plurality of leads connected to the cathode and anode;

an electrolyte solution degassed of residual gas induced by preparatory charging of the battery; and a flexible package configured to contain the battery body therein, wherein the flexible package is sealed at a reduced pressure, thereby maintaining a pressure in the flexible package lower than atmospheric pressure.

* * * * *

UNITED STATES PATENT AND TRADEMARK OFFICE
CERTIFICATE OF CORRECTION

PATENT NO.    : 6,485,862 B1                                                    Page 1 of 1
DATED         : November 26, 2002
INVENTOR(S)   : Yoshioka et al.

It is certified that error appears in the above-identified patent and that said Letters Patent is hereby corrected as shown below:

<u>Title page,</u>
Item [22], the PCT filing date should read -- [22]   PCT Filed:   Dec. 28, 1998 --

Signed and Sealed this

First Day of April, 2003

JAMES E. ROGAN
*Director of the United States Patent and Trademark Office*